(12) United States Patent
Losoya (10) Patent No.: US 10,874,255 B2
(45) Date of Patent: Dec. 29, 2020

(54) FOOD HOLDING APPARATUSES AND METHODS OF USE AND MANUFACTURE

(71) Applicant: Melton John Losoya, Pollock Pines, CA (US)

(72) Inventor: Melton John Losoya, Pollock Pines, CA (US)

(*) Notice: Subject to any disclaimer, the term of this patent is extended or adjusted under 35 U.S.C. 154(b) by 314 days.

(21) Appl. No.: 15/380,944

(22) Filed: Dec. 15, 2016

(65) Prior Publication Data

US 2017/0095119 A1 Apr. 6, 2017

Related U.S. Application Data

(63) Continuation-in-part of application No. 10/392,154, filed on Mar. 19, 2003.

(51) Int. Cl.
*A47J 37/12* (2006.01)

(52) U.S. Cl.
CPC .................. *A47J 37/1295* (2013.01)

(58) Field of Classification Search
CPC .. A47J 37/1295; Y10T 24/202; Y10T 24/203; Y10T 24/205; Y10T 24/44769; Y10T 24/44789; Y10T 24/44462–44479; Y10T 24/44444; Y10T 24/44393; Y10T 24/44376; Y10T 24/44368
See application file for complete search history.

(56) References Cited

U.S. PATENT DOCUMENTS

| 1,596,652 | A |   | 8/1926  | Giovannetti |
| 1,652,972 | A | * | 12/1927 | Beck ....................... F16B 2/241 |
|           |   |   |         | 24/3.12 |
| 2,201,566 | A |   | 5/1940  | Voelker |
| 2,263,965 | A | * | 11/1941 | Fiori ...................... A01K 97/14 |
|           |   |   |         | 294/99.2 |
| 2,358,682 | A | * | 9/1944  | Benton .................. A22C 25/06 |
|           |   |   |         | 24/507 |
| 2,557,890 | A |   | 6/1951  | Perry |
| 2,847,933 | A | * | 8/1958  | Pate ..................... A47J 37/1295 |
|           |   |   |         | 24/327 |

(Continued)

OTHER PUBLICATIONS

Kennedy, Diana, "Empanadas De Hongos" 1998 https://www.splendidtable.org/recipes/empanadas-de-hongos (Year: 1998), 2 pages.

(Continued)

*Primary Examiner* — Viren A Thakur
(74) *Attorney, Agent, or Firm* — Franklin & Associates International Inc; Matthew F. Lainbrinos (57) ABSTRACT

Food holding apparatuses and methods of use and manufacture are provided herein. An apparatus includes a first portion having a first handle and a first side of a clip, the first side includes an first retaining plate having a front surface and a back surface, the back surface includes a first plurality of protrusions that extend from the back surface, a second portion that has a second handle and a second side of the clip, the first side includes a second retaining plate having a front surface and a back surface, the back surface includes a second plurality of protrusions that extend from the back surface, the first plurality of protrusions and the second plurality of protrusions are aligned such that they are brought together to secure a portion of a food item when the apparatus is in a food gripping position.

11 Claims, 10 Drawing Sheets

(56) References Cited

U.S. PATENT DOCUMENTS

| | | | | |
|---|---|---|---|---|
| 2,891,814 | A | * | 6/1959 | Idoine .................. A47J 43/283 |
| | | | | 294/106 |
| 2,956,521 | A | | 10/1960 | Misch |
| 3,361,468 | A | | 1/1968 | Case |
| 3,604,342 | A | * | 9/1971 | Harding .............. A47J 37/1295 |
| | | | | 99/426 |
| 3,767,343 | A | | 10/1973 | Pichonsky |
| 4,363,614 | A | | 12/1982 | Zaremba |
| 4,424,822 | A | * | 1/1984 | Wilborn, II ............ A45D 6/145 |
| | | | | 132/277 |
| 4,535,688 | A | | 8/1985 | Bentson |
| 4,667,999 | A | * | 5/1987 | Goldman ................ A47G 21/10 |
| | | | | 294/31.1 |
| 4,839,947 | A | * | 6/1989 | Cohen .................. A47G 25/485 |
| | | | | 24/499 |
| 4,917,677 | A | * | 4/1990 | McCarthy .............. A61B 17/08 |
| | | | | 294/99.2 |
| 5,158,009 | A | | 10/1992 | Stewart |
| 5,390,889 | A | * | 2/1995 | Hiscock .................. A47G 1/17 |
| | | | | 24/67 CF |
| D375,025 | S | | 10/1996 | Barton |
| 5,571,741 | A | | 11/1996 | LaBoccetta |
| 5,621,950 | A | * | 4/1997 | White ..................... B42F 1/006 |
| | | | | 24/565 |
| 5,846,645 | A | | 12/1998 | Yokota |
| 5,937,743 | A | * | 8/1999 | Overstreet ............ A47J 43/283 |
| | | | | 99/353 |
| 6,382,454 | B1 | | 5/2002 | Buffard |
| 6,484,374 | B2 | * | 11/2002 | McAllister ................ B65F 1/06 |
| | | | | 24/557 |
| 6,591,741 | B1 | | 7/2003 | Martin |
| 6,813,814 | B1 | * | 11/2004 | Schultz .................. A44B 99/00 |
| | | | | 24/545 |
| 7,461,879 | B2 | | 12/2008 | Volk |
| D598,279 | S | * | 8/2009 | Seehoff .......................... D8/395 |
| 2003/0075054 | A1 | * | 4/2003 | Masseria ................ A47J 43/18 |
| | | | | 99/426 |
| 2003/0182773 | A1 | * | 10/2003 | Ellwood ................... F16B 2/10 |
| | | | | 24/334 |
| 2004/0182256 | A1 | * | 9/2004 | Losoya ............... A47J 37/1295 |
| | | | | 99/426 |
| 2008/0116705 | A1 | * | 5/2008 | Rodriguez ............. A47G 21/10 |
| | | | | 294/99.2 |
| 2010/0242742 | A1 | | 9/2010 | Teng |
| 2015/0335084 | A1 | * | 11/2015 | Ditnes ..................... A41F 17/02 |
| | | | | 24/507 |

OTHER PUBLICATIONS

Pending U.S. Appl. No. 29/611,210, filed Jul. 19, 2017.
Abandoned U.S. Appl. No. 29/587,884, filed Dec. 15, 2016.
Restriction Requirement, dated Jan. 18, 2006, U.S. Appl. No. 10/392,154.
Response to Restriction Requirement, filed date Aug. 12, 2016, U.S. Appl. No. 10/392,154.
Reply to Notice of Non-Compliant Amendment, filed date Jan. 23, 2017, U.S. Appl. No. 10/392,154.
Non-Final Office Action, dated Mar. 14, 2017, U.S. Appl. No. 10/392,154.
Amendment, Reply and Request for Reconsideration, filed date Jun. 14, 2017, U.S. Appl. No. 10/392,154.
Final Office Action, dated Sep. 28, 2017, U.S. Appl. No. 10/392,154.
Amendment, Reply and RCE, filed date Feb. 28, 2018, U.S. Appl. No. 10/392,154.
Notice of Allowance, dated Nov. 18, 2017, U.S. Appl. No. 29/587,884.
Notice of Abandonment, dated Feb. 26, 2018, U.S. Appl. No. 29/587,884.

* cited by examiner

FOOD HOLDING APPARATUSES AND METHODS OF USE AND MANUFACTURE

FIELD OF THE PRESENT DISCLOSURE

This invention relates to devices for holding food as it is being fried. Embodiments of the present disclosure are directed to apparatuses that receive and retain food items. More specifically, but not by limitation, embodiments can include a clip style food holding apparatus that holds a food item for cooking and transportation.

GENERAL BACKGROUND

In traditional Mexican cooking, tacos are prepared by deep frying soft tortilla shells that have been pre-filled with taco filling. The taco shells must somehow be held in a closed position while they are being fried, otherwise the meat or other filling will fall out of the shell and into the cooking oil.

In the past, toothpicks have been threaded through the taco shells to temporarily close them during frying. However, there are a number of disadvantages to this method. First, it is time consuming to thread the toothpicks through the shell. Second, the toothpicks are prone to fall out, spilling the taco contents into the hot oil. Third, the toothpicks are not very hygienic, and sometimes they are reused.

Thus, there is a need for a device that can securely but temporarily hold taco shells in a closed position while they are being fried. There is further a need for a device that can hold food other than tacos shells in a closed position while the food is being fried.

SUMMARY

According to some embodiments, the present invention is a clip that holds taco shells closed while they are being fried.

According to some embodiments, the present disclosure is directed to a food clip apparatus, and may comprise: (a) a first portion that comprises a first handle and a first side of a clip, wherein the first side comprises an first retaining plate having a front surface and a back surface, wherein the back surface comprises a first plurality of protrusions that extend from the back surface; (b) a second portion that comprises a second handle and a second side of the clip, wherein the second side comprises a second retaining plate having a front surface and a back surface, further wherein the back surface comprises a second plurality of protrusions that extend from the back surface, the first plurality of protrusions and the second plurality of protrusions are aligned such that they are brought together to secure a portion of a food item when the food clip apparatus is in a food gripping position around the food item; and (c) wherein the first handle and the second handle are coupled in such a way that the first retaining plate and the second retaining plate are resiliently biased into the food gripping position but the first side of the apparatus and the second side of the apparatus can be opened by moving the first handle and the second handle towards one another.

According to some embodiments, the present disclosure is directed to a food clip apparatus constructed by a process, the process may comprise: (a) obtaining a single sheet of material; (b) processing the single sheet of material to create arcuate legs on both ends of the single sheet of material; (c) creating first plurality of protrusions on one of the arcuate legs, and a second plurality of protrusions on the other of the arcuate legs; (d) bending the single sheet of material at a first location to create a front surface of a first handle and a first portion; (e) bending the single sheet of material at a second location to create at a radius and a back surface of the first handle; (f) bending the single sheet of material at a third location to create a back surface of a second handle; (g) bending the single sheet of material at a fourth location to create another radius and a front surface of the second handle; and (h) bending the single sheet of material at a fifth location to create a second portion.

According to some embodiments, the present disclosure is directed to food clip apparatus, the process may comprise: (a) a first portion comprising: (i) a first handle having leg extensions that define a hemispherical opening, the leg extensions being set an angle relative to the first handle; and (ii) a protrusions on terminal ends of the leg extensions and central protrusion located between the terminal ends at an apex of the hemispherical opening; (b) a second portion comprising: (i) a second handle having leg extensions that define a hemispherical opening, the leg extensions being set an angle relative to the second handle; (ii) a protrusions on terminal ends of the leg extensions and central protrusion located between the terminal ends at an apex of the hemispherical opening; and (c) wherein the first handle and the second handle are resiliently coupled so that the first side of the apparatus and the second side of the apparatus can be opened by moving the first handle and the second handle towards one another.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG, 17 illustrates the example apparatus of FIG. 1 in an opened configuration.

DESCRIPTION OF EXEMPLARY EMBODIMENTS

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In some embodiments, the present invention is a clip for use in closing soft taco shells while they are being deep fried. The clip has a two-piece body 10, handles 20, and a spring mechanism 30.

Figure 1:
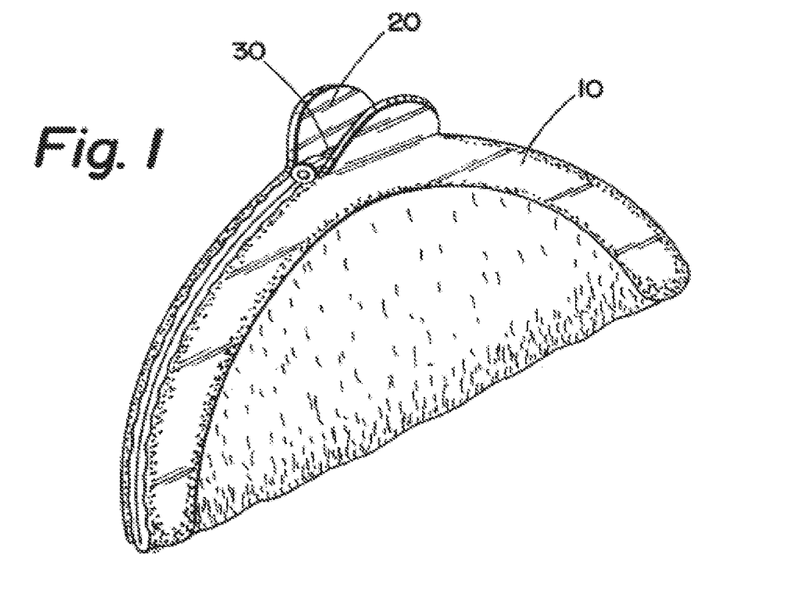
FIG. 1 is a perspective view of a taco that is being held in a closed position using a clip according to an embodiment of the present invention.
Figure 2:
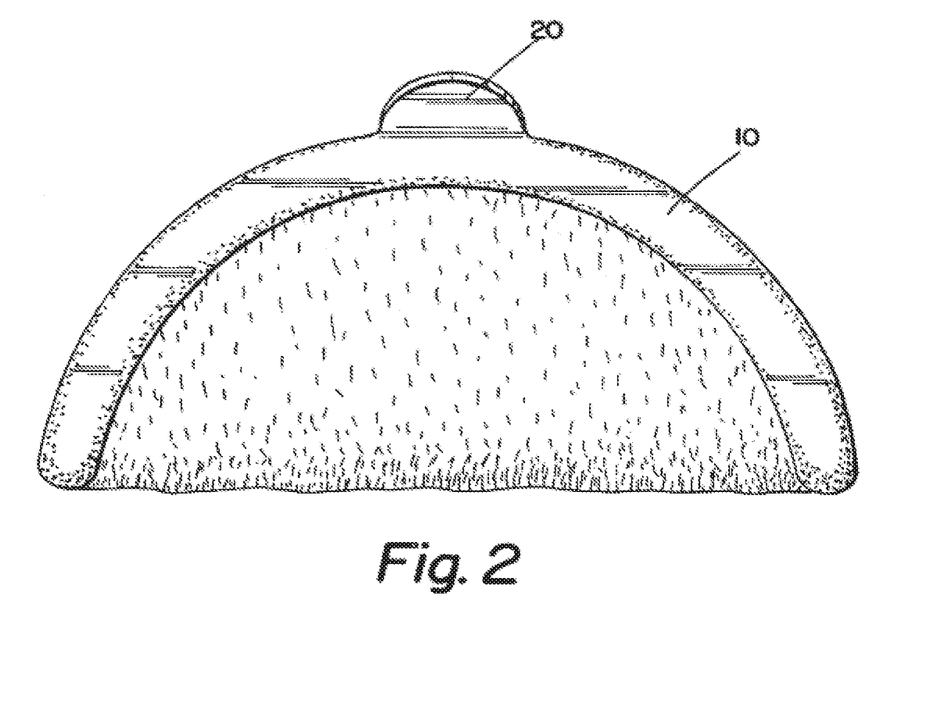
FIG. 2 is a side view of a taco that is being held in a closed position using a clip according to an embodiment of the present invention.
Figure 3:
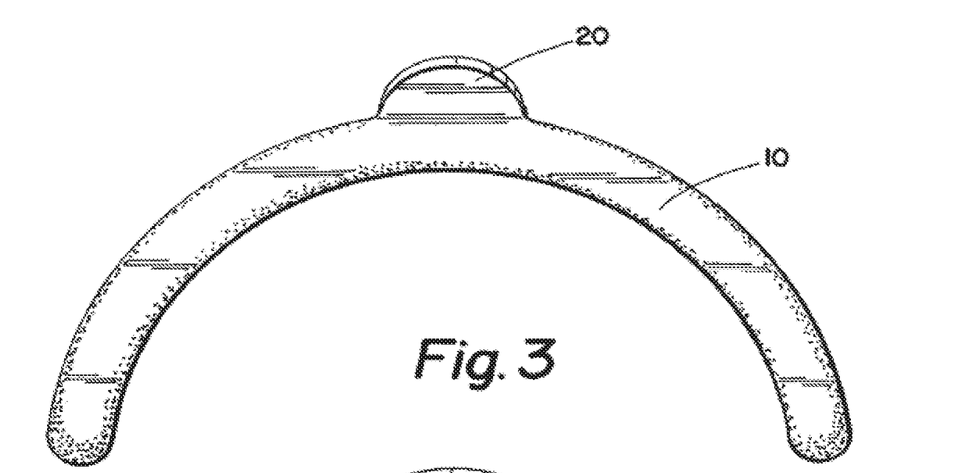
FIG. 3 is a side view of a clip according to an embodiment of the present invention.
Figure 4:
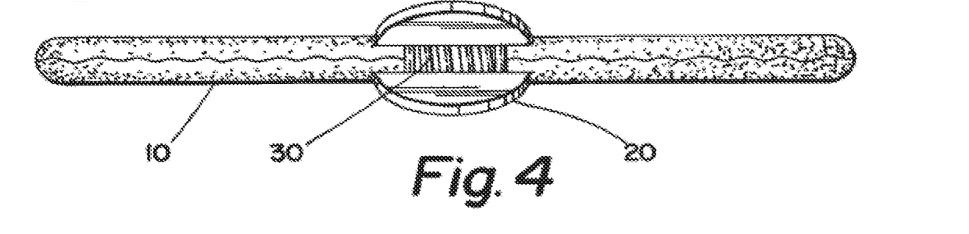
FIG. 4 is a top view of a clip according to an embodiment of the present invention.
Figure 5:
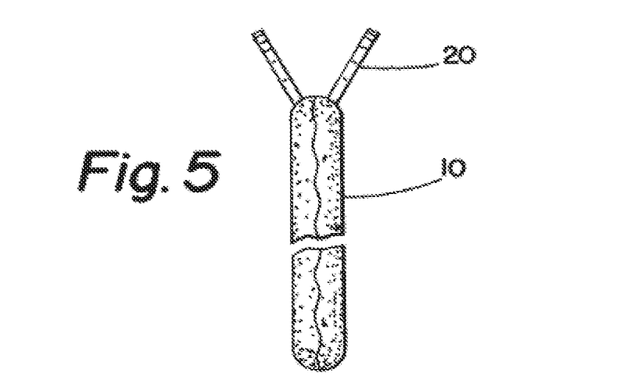
FIG. 5 is a front view of a clip according to an embodiment of the present invention.
Figure 6:
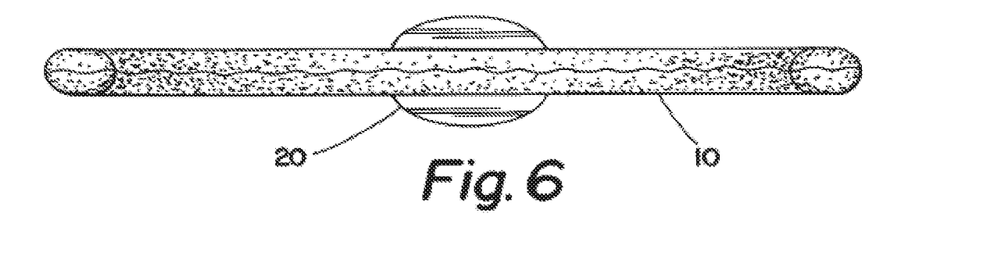
FIG. 6 is a bottom view of a clip according to an embodiment of the present invention.

As shown best in FIGS. 1, 2, and 3, the body is crescent-shaped or u-shaped, so as to completely encompass the outer edge of the folded soft taco shell. The body has two arms, one on each side, and the taco is held between these arms, as depicted in FIGS. 1 and 2. When the handles 20 are squeezed, the two arms of the body 10 separate, allowing the taco shell to be inserted between the arms. When the handles 20 are not being squeezed, the arms of the body fit together. See. FIGS. 4 and 6.

The handles 20 are disposed atop the body 10, and are used to open and close the arms. See FIG. 1. The handles 20 can be integral with the body, or they can be fastened to the body through mechanical means or adhesives.

The spring mechanism 30 is used to bias the arms of the body 10 into a closed position, thereby holding the taco shell firmly closed while it is being fried. Standard spring mechanisms, such as those used on potato-chip clips, binder clips, etc. can be used.

The clip according to some embodiments of the present invention of FIGS. 1 to 6 can be made of a number of materials, including but not limited to metal and plastic or styrene materials. In one embodiment, the clip is made of a heat-tolerant plastic, such as polyetheretherketone, which is sold under the trade name "PEEK."

Unlike toothpicks, some embodiments of the present invention may be reused, so long as it is properly cleaned between uses.

A rack or other holder may be used to hold taco frying clips according to some embodiments of the present invention. When a new taco clip is needed, the chef can simply remove one from the rack. The supply of clips on the rack can be replenished with "used" clips after they have been cleaned. This method is much more convenient and efficient than the traditional toothpick method.

Figure 7:
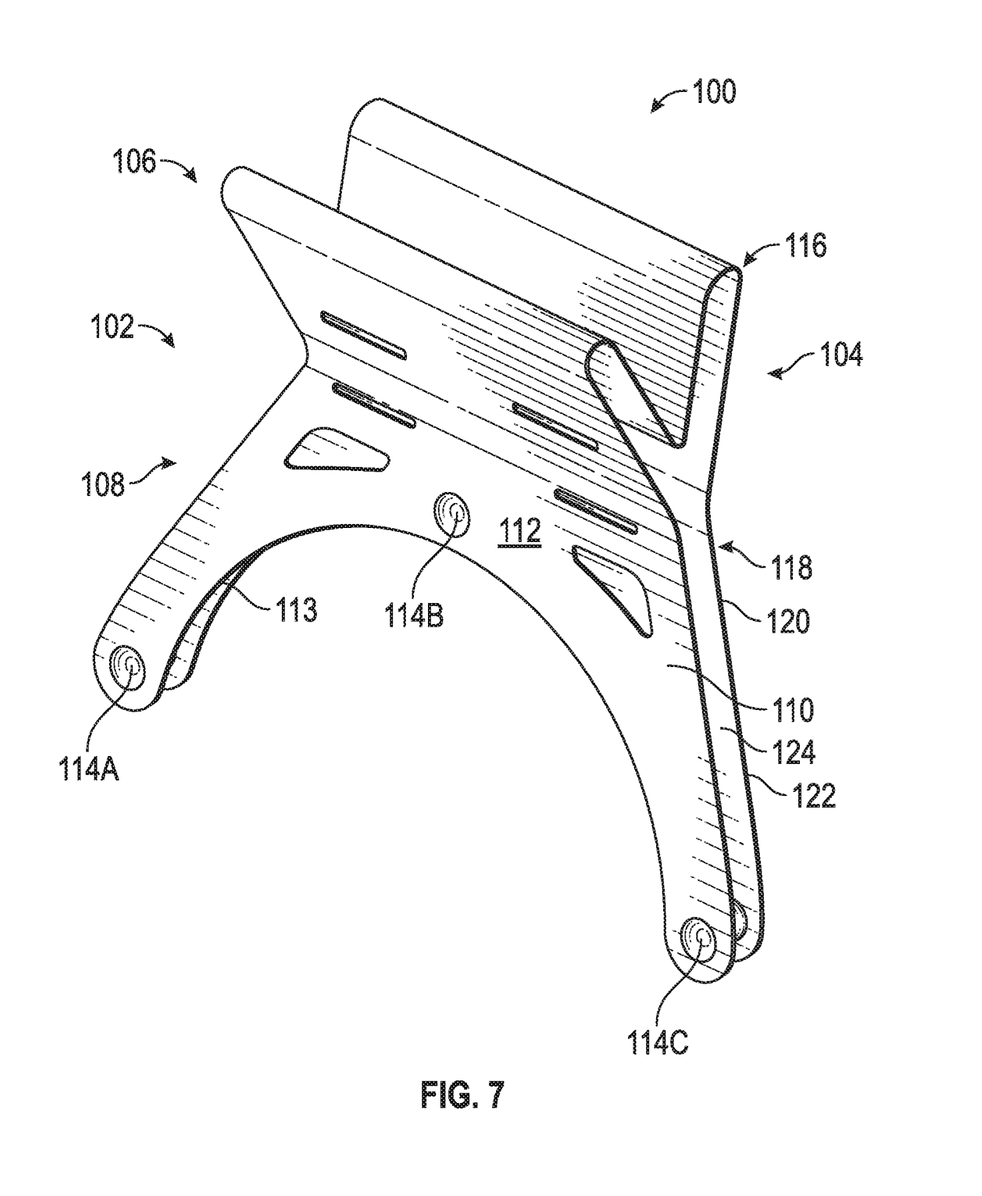
FIG. 7 is a perspective view of an example apparatus constructed in accordance with the present disclosure.

FIG. 7 is a perspective view of an example food clip apparatus 100 constructed in accordance with the present disclosure. The apparatus 100 can be manufactured from any number of materials such as metals, alloys, plastics, and so forth. In one or more embodiments the material selected is a food grade plastic or metal that is capable of being subjected to high temperatures used in various cooking methods. For example, the apparatus 100 of FIG. 7 can be used to securely hold a taco during frying of the taco in oil, which is high temperature cooking method.

The apparatus 100 comprises a first portion 102 and a second portion 104. The first portion 102 comprises a first handle 106 and a first side 108 of a clip. In some embodiments the first side 108 comprises a first retaining plate 110 having a front surface 112 and a back surface 113. In some embodiments the back surface 113 comprises a first plurality of protrusions such as protrusions 114A-C that extend from the back surface 113.

Figure 11:
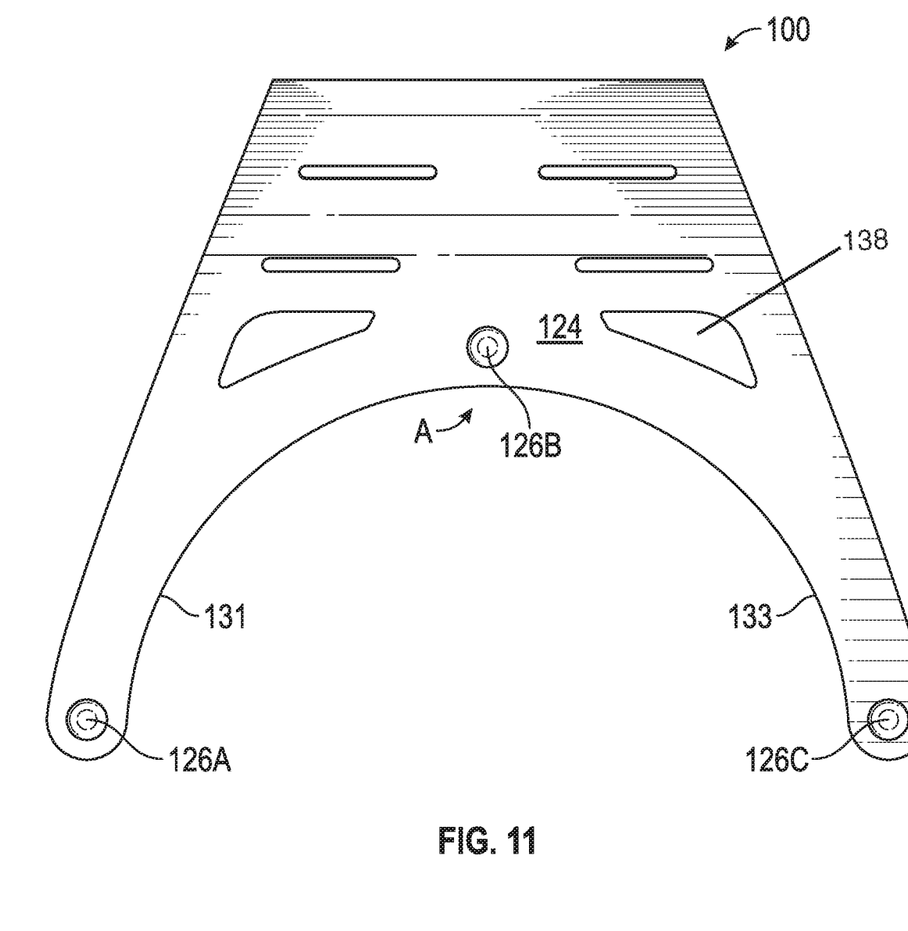
FIG. 11 is a rear plan view of the apparatus of FIG. 7.

Likewise, the second portion 104 comprises a second handle 116 and a second side 118. In some embodiments, the second side 118 comprises a second retaining plate 120 having a front surface 122 and a back surface 124. In one or more embodiments such as illustrated in FIG. 11, the back surface 124 comprises a second plurality of protrusions such as protrusions 126A-C that extend from the back surface 124.

Figure 14:
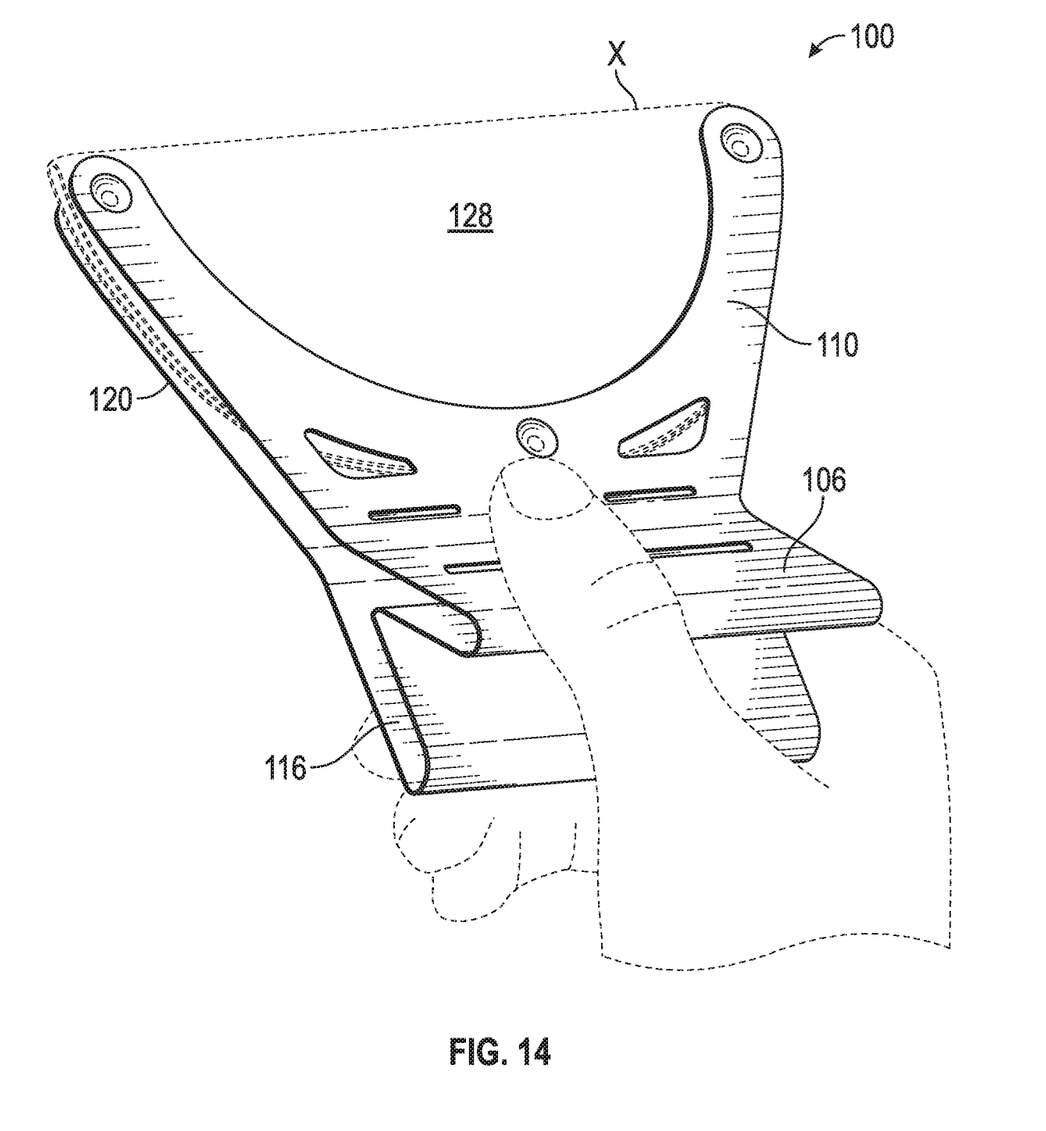
FIG. 14 is a perspective view of the apparatus of FIG. 7 in use securing a food item.
Figure 15:
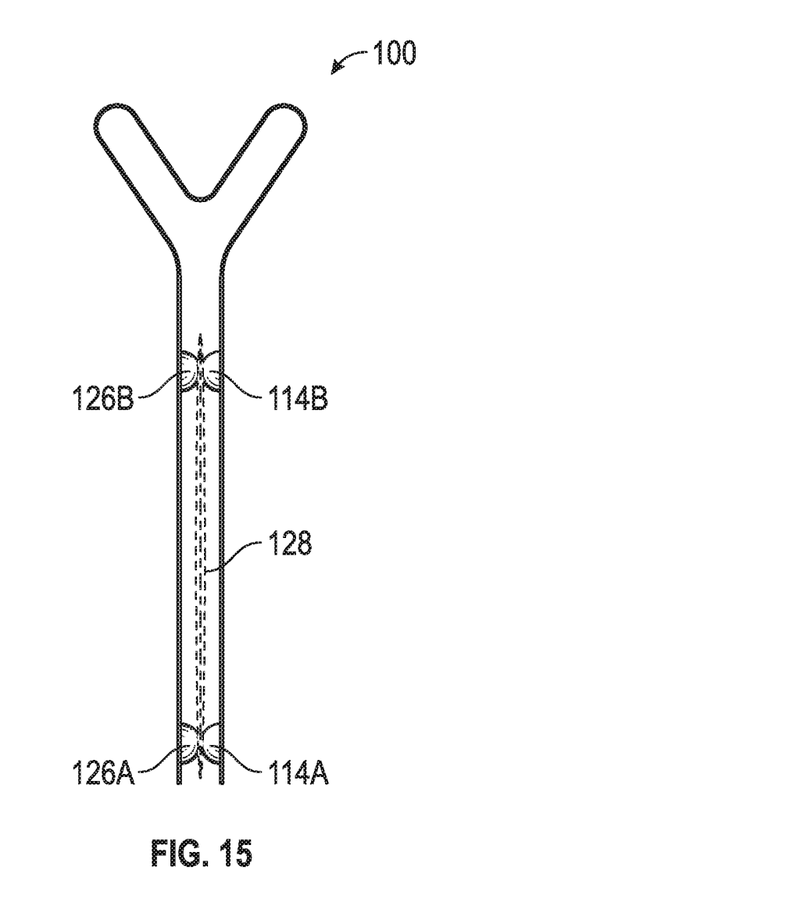
FIG. 15 is a side plan view of the apparatus of FIG. 7 which is shown in use securing the food item.

According to some embodiments, the first plurality of protrusions 114A-C and the second plurality of protrusions 126A-C are aligned such that they are brought together to secure a portion of a food item when the food clip apparatus 100 is in a food gripping position around the food item 128 (see FIGS. 14 and 15).

Figure 17:
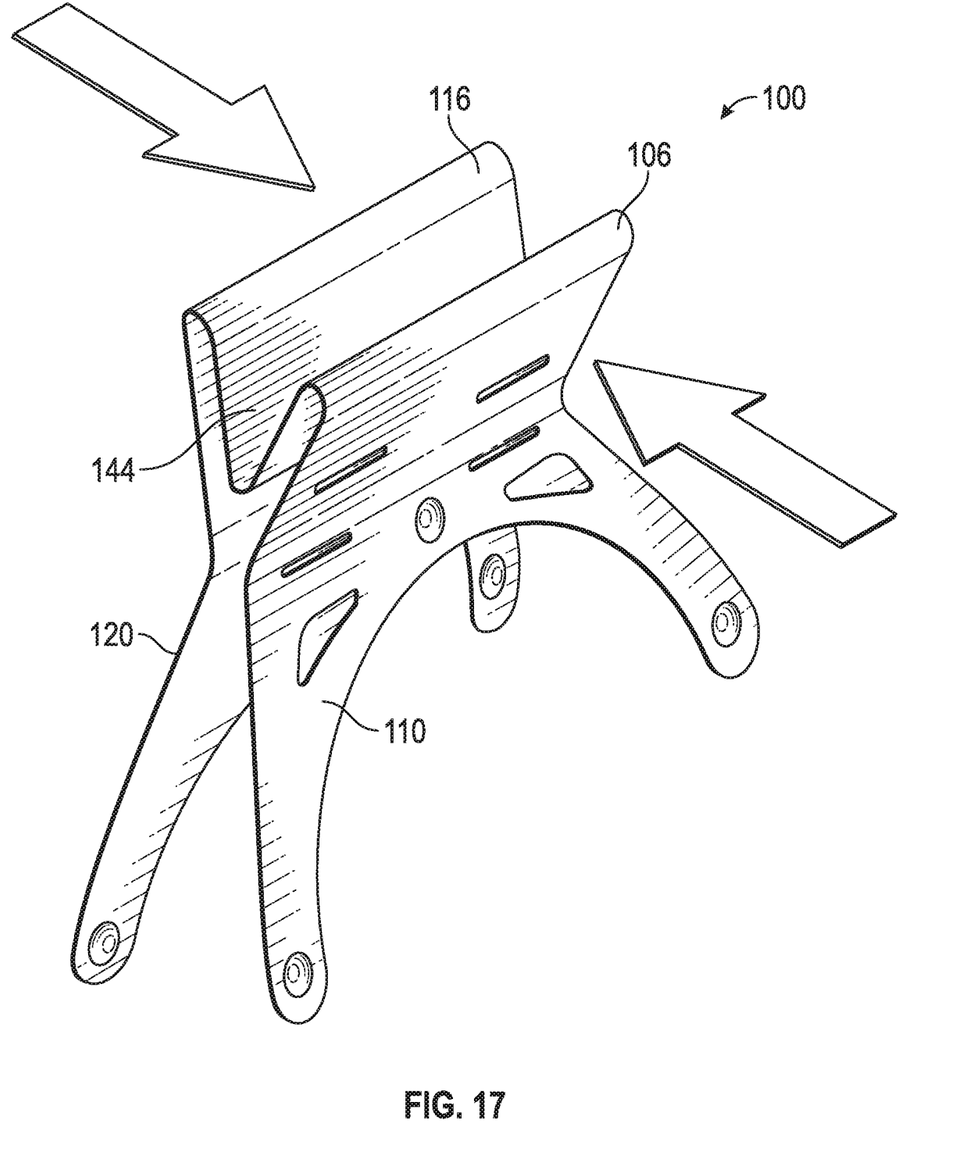

In some embodiments the first handle 106 and the second handle 116 are coupled in such a way that they are resiliently biased into the food gripping position but the first side 108 of the clip and the second side 118 of the clip can be opened by moving the first handle 106 and the second handle 116 towards one another (e.g., pinched together). The retaining plates 110, 120 are resiliently biased in the food gripping position by virtue of the coupling therebetween. In some embodiments, the coupling includes first and second handles 106, 116 and is in sheet form. The sheet material is a resilient material. The first and second handles have sheet profile and diverge outwardly away from one another and then fold over and downwardly towards one another to form a generally V or corrugated shape coupling. In this manner, the sheet material naturally resiliently biases the retaining plates 110, 120 together without any external pressure being applied by hand etc. In some embodiments, the coupling is made up of one continuous sheet of resilient material. The apparatus 100 is illustrated in an open configuration in FIG. 17 as a result of pressing or squeezing the first and second handles 106, 116 together for example by hand and thereby causing the retaining plates 110,120 to open Once the pressure being applied to the first and second handles 106, 116 is released, the retaining plates naturally resiliently close together again in the food gripping position.

In more detail, the first retaining plate 110 and second retaining plate 120 are mirror images of one another, although this need not be the case as the first retaining plate 110 and second retaining plate 120 may have different configurations relative to one another.

Figure 8:
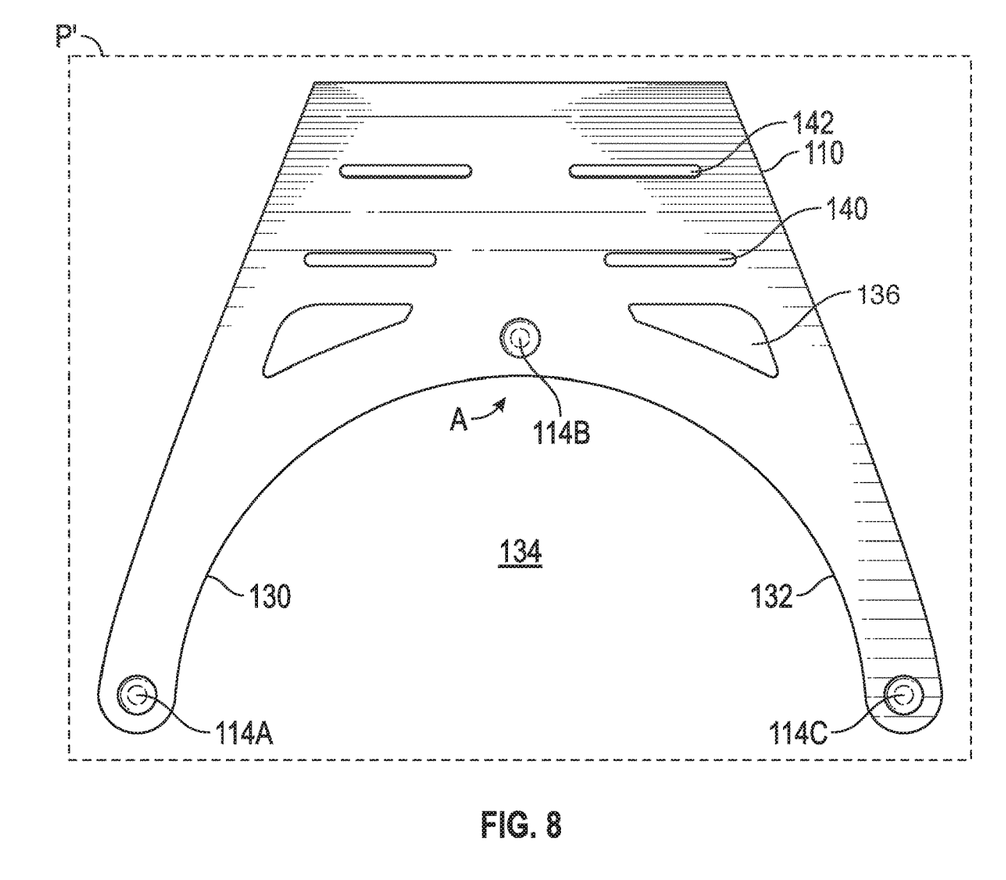
FIG. 8 is a front plan view of the apparatus of FIG. 7.

In FIG. 8 the first retaining plate 110 and the second retaining plate 120 each comprise a pair of elongated legs, such as legs 130 and 132 of first retaining plate 110. These legs 130 and 132 are spaced apart from one another to define a substantially hemispherical or arcuate space/opening 134. The arcuate space 134 allows for exposing of a portion of a food item 128 (again, see FIG. 14).

The first plurality of protrusions 114A-C are disposed in an arcuate pattern on a peripheral edge of the first retaining plate 110 such that protrusions 114A and 114C are disposed on terminal ends of the first retaining plate 110, while protrusion 114B is disposed near an apex A of the arcuate space 134.

Turning to FIG. 11, the second plurality of protrusions 126A-C are disposed in an arcuate pattern on the second retaining plate 120 such that protrusions 126A and 126C are disposed on terminal ends of the second retaining plate 120 (namely legs 131 and 133), while protrusion 126B is disposed near an apex of the arcuate space of the second retaining plate 120, similarly to the configuration of the first retaining plate 110.

In FIG. 8, the first side 108 comprises vent holes such as vent hole 136. The second side 118 also comprises vent holes such as vent hole 138, as illustrated in FIG. 11. Additional vent holes such as vent holes 140 and 142 can also be incorporated into the apparatus 100. Vent holes incorporated into the apparatus 100 all for two functions. First, when the apparatus 100 is exposed to high temperatures during a cooking process, the vent holes allow for thermal transfer to the food item captured in the apparatus 100. When the apparatus 100 holds a taco for example, the vent holes provide a path of fluid communication that allows hot oil to contact more of the outer surface of the taco. The vent holes also provide cooling paths that allow air to circulate around the food item after cooking.

Figure 9:
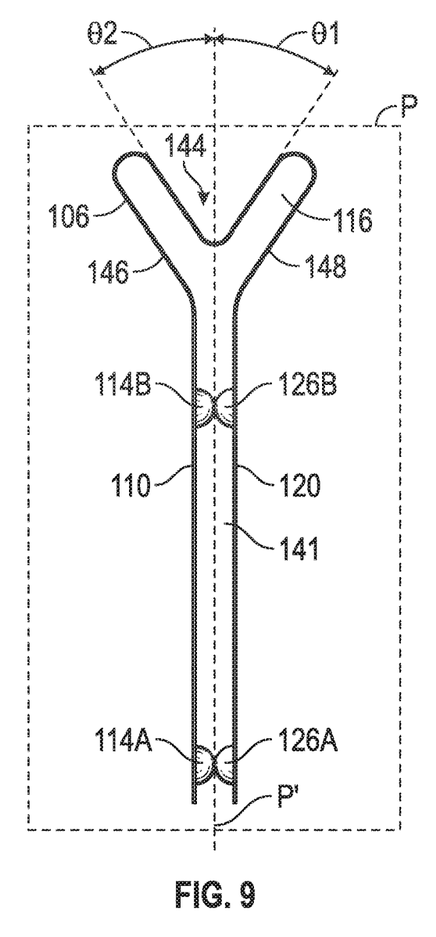
FIG. 9 is a side plan view of the apparatus of FIG. 7.
Figure 10:
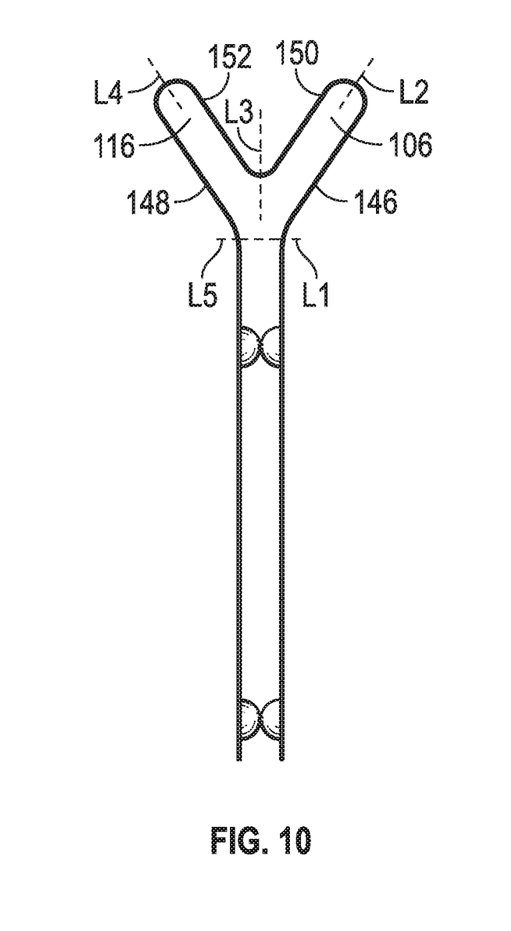
FIG. 10 is an opposing side plan view of the apparatus of FIG. 7.

In FIGS. 9 and 10 (respective side elevation views), the first handle 106 and the second handle 116 are coupled together through an integrated v-shaped spring 144. In some embodiments the integrated v-shaped spring 144 provides the resilient biasing of the first retaining plate 110 and the second retaining plate 120. FIG. 9 also provides a view of a cross section of the apparatus 100. The apparatus 100 has a substantially hollow and y-shaped cross sectional area relative to a plane P that intersects the apparatus perpendicularly to a plane P' that is coplanar with the first retaining plate 110 when the apparatus 100 is in the food gripping position.

FIGS. 9 and 10 also illustrate a substantially y-shaped cross section of the apparatus 100, as well as the contact between the respective protrusions of the apparatus 100. More specifically, protrusion 114A is contacting protrusion 126A and protrusion 114B is contacting protrusion 126B. This configuration creates a space 141 between the first retaining plate 110 and the second retaining plate 120.

A front surface 146 of the first handle 106 extends at an angle θ1 relative to the plane P'. A front surface 148 of the second handle 116 extends at an angle θ2 relative to the plane P'.

Figure 12:
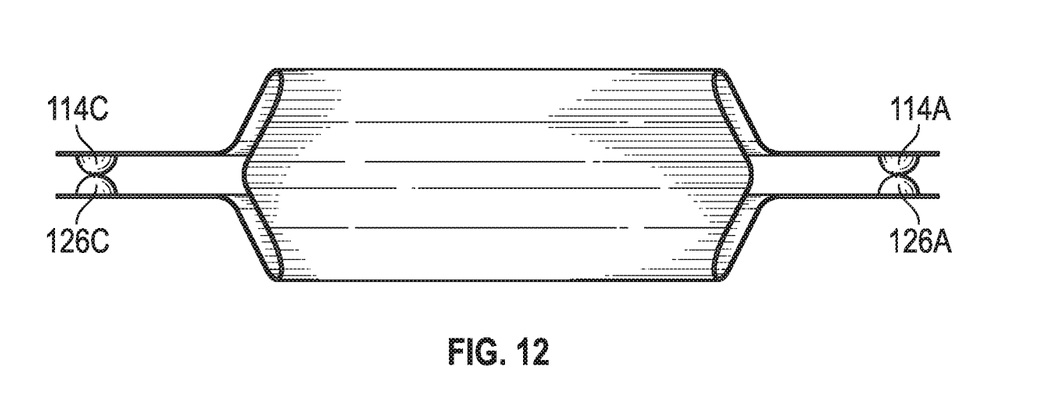
FIG. 12 is a top down view of the apparatus of FIG. 7.
Figure 13:
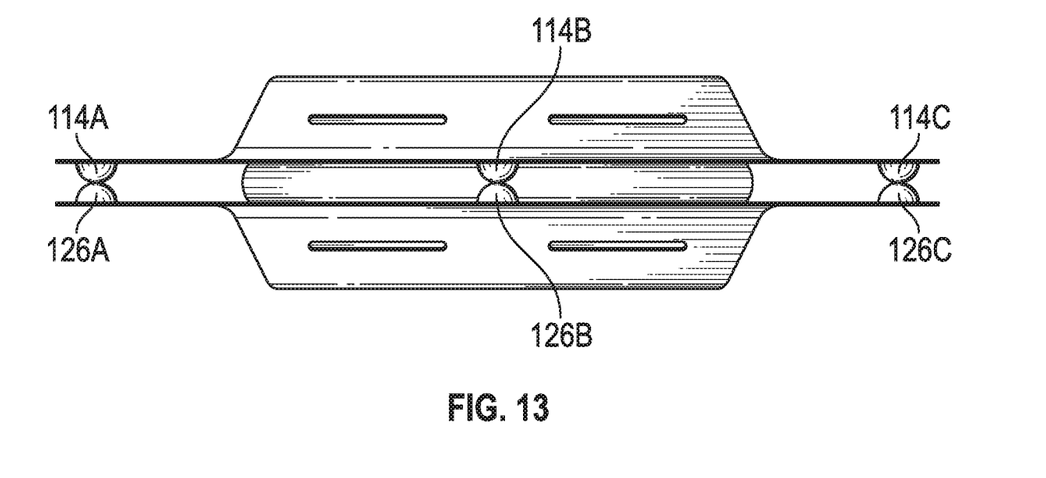
FIG. 13 is a bottom plan view of the apparatus of FIG. 7.

FIG. 12 illustrates contact between protrusion 114A and protrusion 126A, as well as between protrusion 114O and protrusion 126O. FIG. 13 illustrates contact between protrusion 114A and protrusion 126A, as well as between protrusion 114B and protrusion 126B and protrusion 126C.

FIG. 14 illustrates the apparatus 100 in use to hold the food item 128, which in this embodiment is a taco shell comprising a filling. The apparatus 100 is biased into an open position by pinching of first handle 106 and second handle 116 together separates and opens the first retaining plate 110 and the second retaining plate 120.

The food item 128 is placed between the first retaining plate 110 and the second retaining plate 120 and the user releases the first handle 106 and second handle 116. The release of the first handle 106 and second handle 116 the first retaining plate 110 and the second retaining plate 120 to clamp around a periphery X of the food item 128. More specifically, the protrusions of the of the first retaining plate 110 and the second retaining plate 120 press on the food item 128 to seal a filling within the food item 128.

FIG. 15 illustrates a cross section view of the food item 128 captured between protrusion 114A and protrusion 126A, as well as protrusion 114B and protrusion 126B of the apparatus 100. The food item 128 is also capture between the protrusion 1140 and protrusion 1260 although not illustrated in this view.

In some embodiments, the food clip does not include some or all of the protrusions, that is, one or more of the protrusions of the first retaining plate and/or one or more of the protrusions of the second retainer plate are omitted.

Figure 16:
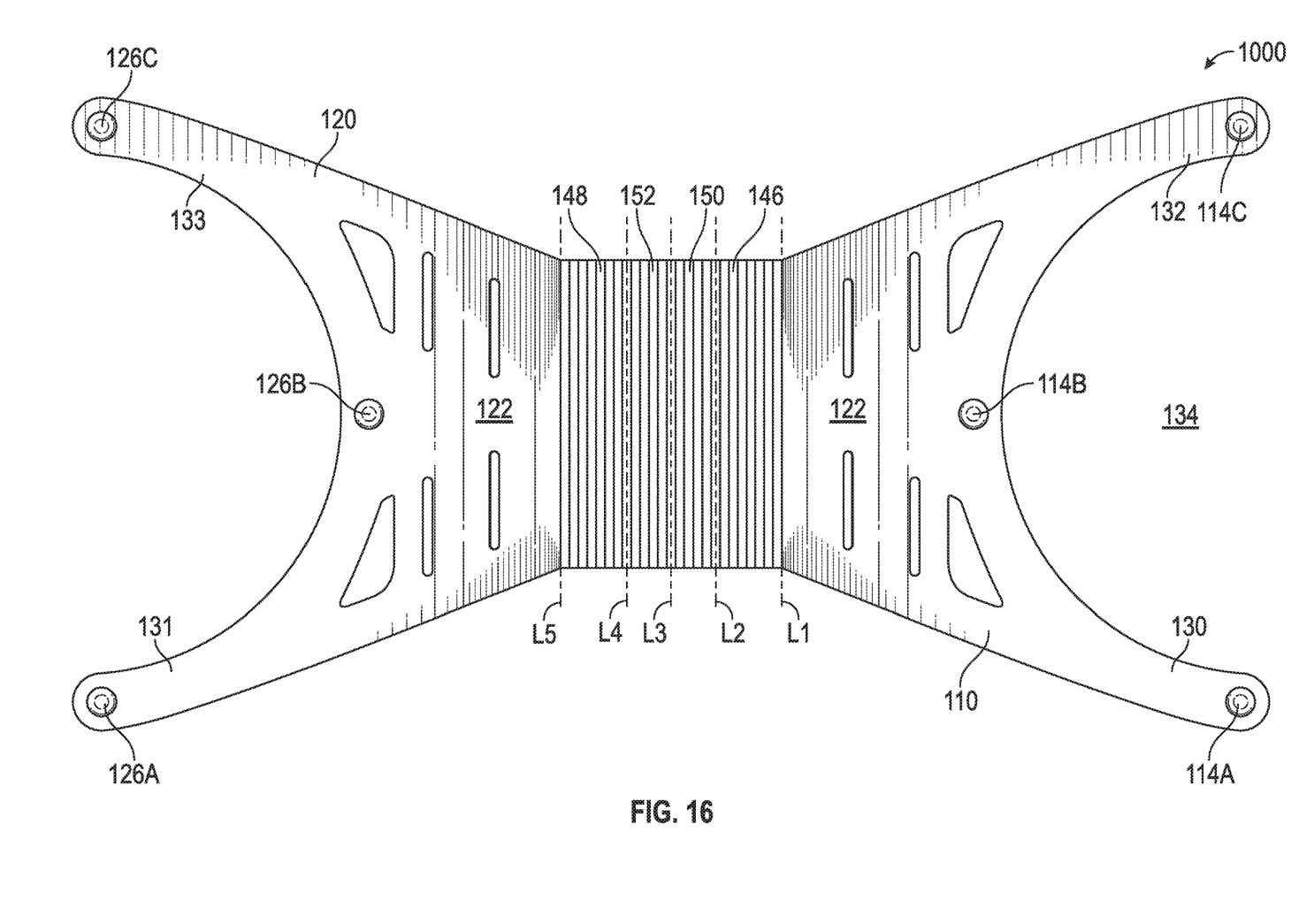
FIG. 16 illustrates a sheet of material prior to being formed into the apparatus of FIG. 7.

FIG. 16 illustrates a sheet of material 1000 that has been stamped or otherwise cut to have a general shape that is foldable to create an apparatus of the present disclosure. Bending locations are also illustrated on FIG. 4 for additional context.

In some embodiments, a method or process of creating a food clip apparatus comprises a step of obtaining a single sheet of material. Material 1000 is transformed into a food clip apparatus by first processing the single sheet of material 1000 to create legs on both ends of the single sheet of material. The legs 130 and 132 are created on first retaining plate 110 by removing a section of material to create the arcuate space 134. A corresponding arcuate space is created on the opposing side of the material 1000 to create the legs 131 and 133 of the second retaining plate 120.

The protrusions 114A-C on the first retaining plate 110 are created by punching or stamping. The protrusions 126A-C on the second retaining plate 120 are also created by punching or stamping. Some embodiments comprise cutting out of vent holes.

In one embodiment, the process includes bending the single sheet of material 1000 at a first location L1 to create the front surface 146 of the first handle 106 and angle the front surface 146 from the front surface 112 of the first retaining plate 110. The process also includes a step of bending the single sheet of material at a second location L2 to create at a radius and a back surface 150 of the first handle 106. The process also comprises bending the single sheet of material 1000 at a third location L3 to create a back surface 152 of the second handle 116. Next, the method includes a step of bending the single sheet of material 1000 at a fourth location L4 to create another radius and the front surface 148 of the second handle 116.

In some embodiments, the method includes bending the single sheet of material 1000 at a fifth location L5 to create the angle between the front surface 148 from the front surface 122 of the second retaining plate 120.

Referring again to FIG. 17 which illustrates the apparatus 100 in an opened configuration. In more detail, the apparatus 100 is placed into the opened configuration by pinching or otherwise bringing the first handle 106 in closer proximity to the second handle 116, which compresses the v-shaped sheet spring 144. The compression of the v-shaped sheet spring 144 causes the space between the first retaining plate 110 and the second retaining plate 120 to increase in size to receive a food item. Once the food item is in place, the user releases the compressive force on the v-shaped sheet spring 144 which causes the first handle 106 and the second handle 116 to move away from one another while the first retaining plate 110 and the second retaining plate 120 enclose around the food item.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A food clip apparatus formed from a single sheet of material, the food clip apparatus comprising:
the single sheet of material having a first portion and a second portion;
wherein the first portion comprises a first handle and a first side of a clip, wherein the first side comprises a first retaining plate having a front surface and a back surface, wherein a front surface of the first handle and the front surface of the first retaining plate are formed from a fold in the single sheet of material at a first location and wherein a back surface of the first handle is formed from a fold in the single sheet of material at a second location; and wherein the first portion further comprises a first plurality of protrusions extending from the back surface of the first retaining plate;
wherein the second portion comprises a second handle and a second side of the clip, wherein the second side comprises a second retaining plate having a front surface and a back surface, wherein a front surface of the second handle and the front surface of the second retaining plate are formed from a fold in the single sheet of material at a fifth location, wherein a back surface of the second handle is formed from a fold in the single sheet of material at a fourth location, wherein the second portion further comprises a second plurality of protrusions that extend from the back surface of the second retaining plate;

wherein the first plurality of protrusions and the second plurality of protrusions are aligned such that they are brought together to secure a portion of a food item when the food clip apparatus is in a food gripping position around the food item; and wherein the first handle and the second handle are coupled together through an integrated v-shaped spring formed from a fold in the sheet material at a third location, the v-shaped spring providing resilient biasing of the first retaining plate and the second retaining plate to place the first handle and the second handle into the food gripping position such that the first side of the apparatus and the second side of the apparatus can be opened by moving the first handle and the second handle towards one another, wherein each of the first retaining plate and the second retaining plate comprise leg extensions that form a hemispherical opening whereby, when the food item is placed into the apparatus in a folded state, the food item is secured at its peripheral edge by the first plurality of protrusions and the second plurality of protrusions and exposed through the hemispherical opening, wherein the first plurality of protrusions and the second plurality of protrusions contact one another when the first handle and the second handle are not opened, and wherein the food clip apparatus formed from the single sheet of material has a y-shaped cross-section relative to a plane that perpendicularly intersects the first retaining plate and the second retaining plate when the apparatus is in the food gripping position and when the first retaining plate and the second retaining plate being aligned in substantially parallel relative to one another, and wherein a radius is created by the fold at the second location such that the first handle has the front surface and the back surface, and another radius is created by the fold at the fourth location such that the second handle has the front surface and the back surface.

2. The apparatus according to claim 1, further comprising vent holes in each of the first side and the second side.

3. The apparatus according to claim 2, further comprising additional vent holes in the first handle and the second handle.

4. The apparatus according to claim 1, wherein the y-shaped cross-section has a substantially hollow cross sectional area.

5. A food clip apparatus constructed by a process, the process comprising:
obtaining a single sheet of material having opposing ends;
processing the single sheet of material to create arcuate legs on both the ends of the single sheet of material;
creating first plurality of protrusions on the arcuate legs of one of the ends of the single sheet of material, and a second plurality of protrusions on the arcuate legs of the other end of the single sheet of material;
folding the single sheet of material at a first location to create a front surface of a first handle and a first portion;
folding the single sheet of material at a second location to create at a radius and a back surface of the first handle; the folding at the second location also positioning the front surface of the first handle in spaced apart relationship to the back surface of the first handle;
folding the single sheet of material at a third location to create a back surface of a second handle and the fold line at the third location creating a resilient fold between the back surface of the first and second handle;
folding the single sheet of material at a fourth location to create another radius and a front surface of the second handle; the folding at the fourth location also positioning the front surface of the second handle in spaced apart relationship to the front surface of the second handle;
folding the single sheet of material at a fifth location to create a second portion that extends from the front surface of the second handle; and
wherein the arcuate legs on both ends of the single sheet of material each comprise a hemispherical opening such that a food item captured between the arcuate legs on both ends of the single sheet of material is exposed through the hemispherical openings when the food item is placed into the apparatus, the food item being secured at its peripheral edge by protrusions that extend from each of the arcuate legs on both ends of the single sheet of material, as well as at an apex of the hemispherical opening, wherein the food clip apparatus formed from the single sheet of material has a y-shaped cross-section relative to a plane that perpendicularly intersects the first portion and the second portion and when the arcuate legs of the first portion and the arcuate legs of the second portion being aligned and spaced apart in parallel relative to one another.

6. The food clip apparatus construed by the process according to claim 5, wherein the resilient fold between the back surface of the first and second handle is a v-shaped angle that allows for resilient opening of the apparatus through pinching together the first handle and the second handle.

7. A food clip apparatus formed from a single sheet of material, the food clip apparatus comprising:
the single sheet of material having a first portion and a second portion,
wherein the first portion comprises:
a first handle that is formed from a fold in the single sheet of material at a first location and from another fold at a second location of the single sheet of material, the first handle having leg extensions that define a hemispherical opening, the leg extensions being set at an angle relative to the first handle; and
a first plurality of protrusions on terminal ends of the first handle leg extensions and;
a central protrusion located between the terminal ends at an apex of the hemispherical opening of the first handle; and
wherein the second portion comprises:
a second handle that is formed from a fold in the single sheet of material at a fourth location and from another fold at a fifth location of the single sheet of material, the second handle having leg extensions that define a hemispherical opening, the second handle leg extensions being set at an angle relative to the second handle;
a second plurality of protrusions on terminal ends of the second handle leg extensions; and
a central protrusion located between the terminal ends at an apex of the hemispherical opening of the second handle; and wherein the first handle and the second handle are resiliently coupled through a fold formed in the sheet material at a third location so that the first portion of the apparatus and the second portion of the apparatus can be opened by moving the first handle and the second handle towards one another, whereby, when the food item is placed into the apparatus in a folded state, the food item is secured at its peripheral edge by the first plurality of protrusions and the second plurality of protrusions and the food item is exposed through the hemispherical openings, and wherein the first plurality of protrusions and the second plurality of protrusions contact one another when the first handle and the second handle are not opened; wherein the food clip apparatus formed from the single sheet has a y-shaped cross-section relative to a plane that perpendicularly intersects the first and second portion and when the first portion and the second portion being aligned in parallel relative to one another, further wherein a radius is created by the fold at the second location such that the first handle has a front surface and a back surface, and another radius is created by the fold at the fourth location such that the second handle also has a front surface and a back surface.

8. The apparatus according to claim 7, wherein the first handle and the second handle are coupled together through an integrated v-shaped spring, wherein the integrated v-shaped spring provides the resilient coupling.

9. The apparatus according to claim 7, further comprising vent holes in each of the first side and the second side.

10. The apparatus according to claim 9, further comprising additional vent holes in the first handle and the second handle.

11. The apparatus according to claim 7, wherein the y-shaped cross-section has a cross sectional area that is substantially hollow.

* * * * *

UNITED STATES PATENT AND TRADEMARK OFFICE
CERTIFICATE OF CORRECTION

PATENT NO. : 10,874,255 B2
APPLICATION NO. : 15/380944
DATED : December 29, 2020
INVENTOR(S) : Melton John Losoya Page 1 of 1

It is certified that error appears in the above-identified patent and that said Letters Patent is hereby corrected as shown below:

On the Title Page

Item (63) delete "Continuation-in-part of application No. 10/392,154, filed on Mar. 19, 2003"

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*